US012214837B2

(12) United States Patent
Zahn et al.

(10) Patent No.: US 12,214,837 B2
(45) Date of Patent: Feb. 4, 2025

(54) SYSTEMS AND METHODS FOR BICYCLE STORAGE WITH ASYMMETRICAL, SHARED INDIVIDUAL STORAGE SPACES

(71) Applicant: My Bike Valet, Inc., Somerville, MA (US)

(72) Inventors: Walter B. Zahn, Somerville, MA (US); Doris Baumgaertner, Dielheim (DE)

(*) Notice: Subject to any disclaimer, the term of this patent is extended or adjusted under 35 U.S.C. 154(b) by 0 days.

(21) Appl. No.: 17/885,139

(22) Filed: Aug. 10, 2022

(65) Prior Publication Data
US 2023/0064081 A1    Mar. 2, 2023

Related U.S. Application Data

(60) Provisional application No. 63/239,366, filed on Aug. 31, 2021.

(51) Int. Cl.
*B62H 3/12* (2006.01)

(52) U.S. Cl.
CPC ...................... *B62H 3/12* (2013.01)

(58) Field of Classification Search
CPC .... B62H 3/04; B62H 3/12; B62H 3/08; E04H 6/005
See application file for complete search history.

(56) References Cited

U.S. PATENT DOCUMENTS

| 1,202,444 | A | * | 10/1916 | Soleau | A47B 81/005 211/24 |
|---|---|---|---|---|---|
| 3,202,289 | A | * | 8/1965 | Burditt | B62H 3/04 211/22 |

(Continued)

FOREIGN PATENT DOCUMENTS

| AU | 2021 101227 | 5/2021 |
|---|---|---|
| CA | 2 896 034 | 1/2017 |

(Continued)

OTHER PUBLICATIONS

WIPO/PCT ISA/US International Search Report and Opinion for Appln: PCT/US19/50121 (Inventors: Walter B. Zahn, Thomas Buchheister; Applicant: Avenue Management Consulting, Inc.; filed Sep. 7, 2019); Search Report and Opinion mailed Jan. 6, 2020 (27 pp.).

(Continued)

*Primary Examiner* — Ko H Chan
(74) *Attorney, Agent, or Firm* — Maura K. Moran; Cambridge Technology Law LLC

(57) ABSTRACT

A bicycle storage unit has a support base with parallel, horizontal first and second base frame bars spaced apart from each other; and vertical, parallel support posts extending perpendicularly from the base bottom frame bars, for suspending bicycles in a double row along the length of the unit. Adjacent support posts in a first and second set of support posts are spaced apart on the first and second side, respectively, to allow at least part of a bicycle to be passed therebetween for suspending from one of the support posts in the second and first set, respectively. One of the first set of support posts is positioned on the first base frame bar at a first post location that is across the space between the first side and the second side from a second post location on the second base frame bar between adjacent support posts in the second set.

22 Claims, 13 Drawing Sheets

(56) References Cited

U.S. PATENT DOCUMENTS

| | | | | |
|---|---|---|---|---|
| 3,785,500 A * | 1/1974 | Kennelly | ............... | B62H 3/04 |
| | | | | D12/115 |
| 4,033,459 A * | 7/1977 | Zach | .................. | B62H 3/10 |
| | | | | 211/20 |
| 5,979,120 A | 11/1999 | Hollstedt | | |
| 6,349,515 B1 | 2/2002 | Naudts | | |
| 6,419,096 B1 * | 7/2002 | Shepherd | ............... | B62H 3/12 |
| | | | | 211/18 |
| 7,481,027 B2 | 1/2009 | Blume | | |
| 8,437,873 B2 | 5/2013 | North | | |
| 8,905,245 B2 * | 12/2014 | Long | ................... | B62H 3/04 |
| | | | | 211/20 |
| 10,161,178 B1 | 12/2018 | Appleby | | |
| 11,203,883 B2 | 12/2021 | Zahn et al. | | |
| 2010/0072238 A1 | 3/2010 | Pape | | |
| 2010/0204823 A1 | 8/2010 | North | | |
| 2012/0215346 A1 | 8/2012 | Gingher | | |
| 2013/0143536 A1 | 6/2013 | Ratti | | |
| 2015/0221139 A1 | 8/2015 | Bogaard | | |
| 2017/0069154 A1 | 3/2017 | Hilton et al. | | |
| 2018/0080241 A1 | 3/2018 | Greenblatt et al. | | |
| 2020/0080333 A1 | 3/2020 | Zahn et al. | | |

FOREIGN PATENT DOCUMENTS

| | | |
|---|---|---|
| CA | 2896034 A1 * | 1/2017 |
| CN | 101920737 | 12/2010 |
| CN | 206 841 578 | 1/2018 |
| DE | 9217562 | 7/1993 |
| DE | 29514276 | 1/1996 |
| DE | 19805228 | 8/1999 |
| EP | 2 539 212 | 1/2013 |
| JP | 2002089069 | 3/2002 |
| JP | 2013053472 | 3/2013 |
| JP | 2014142680 | 8/2014 |
| JP | 2014211022 | 11/2014 |
| JP | 2015132153 | 7/2015 |
| JP | 2017008591 | 1/2017 |
| JP | 2017084264 | 5/2017 |
| NL | 2 010 963 | 12/2013 |
| WO | 2017023336 | 2/2017 |

OTHER PUBLICATIONS

Applicant Information Disclosure Statement (IDS) for U.S. Appl. No. 16/563,870 (U.S. Pat. No. 11,203,883; Inventors: Walter B. Zahn, Thomas Buchheister; Applicant: Avenue Management Consulting, Inc.; filed Sept. 7, 2019); IDS submitted to USPTO Apr. 2, 2020 (6 pp.).

USPTO Office Action for U.S. Appl. No. 16/563,870; Office Action mailed Mar. 9, 2021 (44 pp.).

WIPO/PCT ISA/US International Preliminary Report On Patentability for Appln: PCT/US19/50121, Report mailed Mar. 3, 2021 (19 pp.).

Applicant Request for Interview and Proposed Agenda for U.S. Appl. No. 16/563,870; Request mailed to USPTO Aug. 3, 2021 (11 pp.).

Office Action Response for U.S. Appl. No. 16/563,870; Response mailed to USPTO Aug. 9, 2021 (26 pp.).

USPTO Notice of Allowance and Notice of Allowability for U.S. Appl. No. 16/563,870; Notice mailed Aug. 23, 2021 (5 pp.).

Applicant Statement About the Notice of Allowance and Notice of Allowability for U.S. Appl. No. 16/563,870; Statement mailed to the USPTO Nov. 11, 2021 (2 pp.).

EPO Supplemental Search Opinion for EP Appln: 19 859 490.5 (Inventors: Walter B. Zahn, Thomas Buchheister; Applicant: Avenue Management Consulting, Inc.; entered into Natl Phase Mar. 3, 2021); Search Opinion mailed May 2, 2022 (8 pp.).

Wheelylift, website home page, Jul. 28, 2021, English, https://web.archive.org/web/20210728034958/https://wheelylift.com/en/ Wheelylift, Wateringen, South Holland, Netherlands (5 pp.).

EPO Communication and Search Report for EP Appln: EP22191069.8 (Applicants: Avenue Management Consulting, Inc., Draht Mayr GmbH; filed Aug. 18, 2022; Search Opinion mailed Dec. 22, 2022 (12 pp.).

Wheelylift.com B.V. i.o., photograph of wall-mounted bicycle storage system with hoists (Wheelylift_wall-mounted_hoists.pdf), published Jul. 15, 2016, by Wheelylift.com, Wateringen, South Holland, Netherlands (and currently in use on https://www.wheelylift.com/wiz/ and at https://www.dambis.ee/en/product/wheely-on-wall/ as https://www.dambis.ee/wp-content/uploads/img-4109.jpeg).

Wheelylift.com B.V. i.o., photograph of rack-mounted bicycle storage system with hoists mounted on exterior surfaces of vertical rack posts (Wheelylift_rack-mounted_hoists.pdf), published before Aug. 5, 2021, by Wheelylift.com, Wateringen, South Holland, Netherlands (and currently in use on https://www.bikestoragesolutions.com/wheelylift as https://lirp.cdn-website.com/a94b47ec/dms3rep/multi/opt/Rotkreuz+3-1920w.jpeg).

* cited by examiner

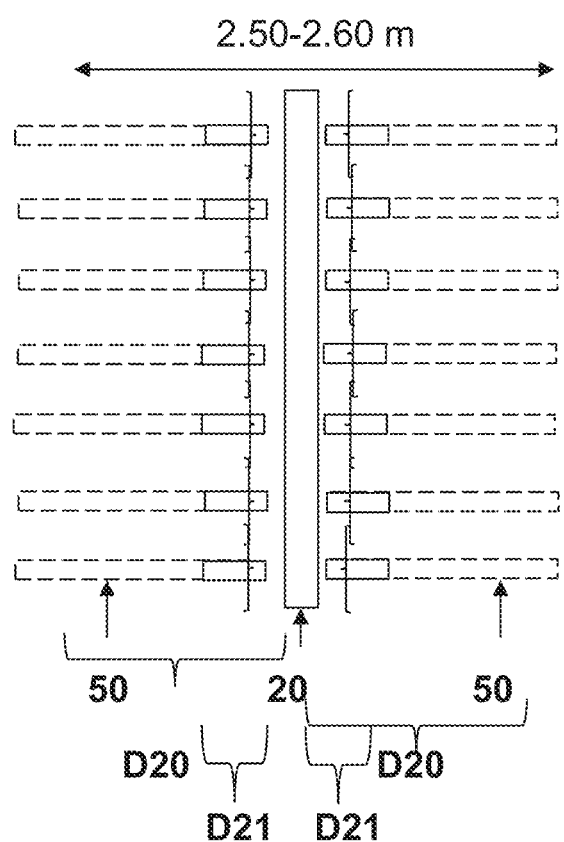

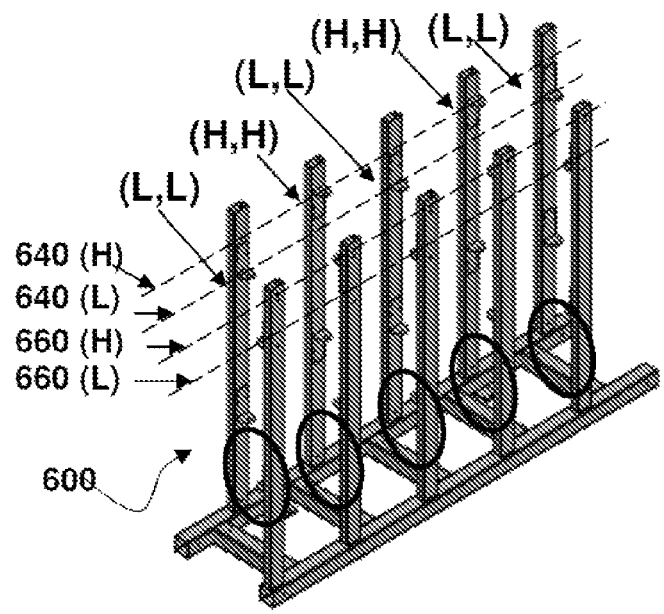
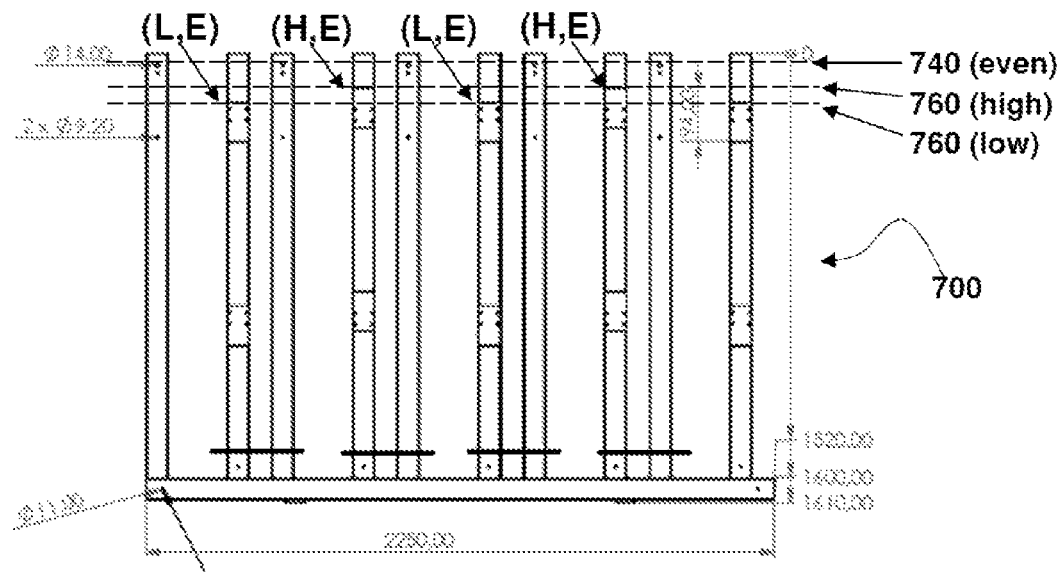

SYSTEMS AND METHODS FOR BICYCLE STORAGE WITH ASYMMETRICAL, SHARED INDIVIDUAL STORAGE SPACES

DESCRIPTION OF THE INVENTION

Cross-Reference to Related Application

This invention relates to the following application, herein incorporated by reference and the filing date of which Applicant claims the benefit at least in part: U.S. Ser. No. 63,239,366, entitled "SYSTEMS AND METHODS FOR BICYCLE STORAGE WITH ASYMMETRICAL, SHARED INDIVIDUAL STORAGE SPACES" (filed Aug. 31, 2021; Inventors: Walter Zahn, Doris Baumgaertner; Applicant: Avenue Marketing Consulting, Inc.).

Field

The present invention relates to the field of bicycle storage and management, and particularly to the storage of bicycles.

Background

This invention relates to methods and systems which facilitate bicycle storage and computer-based control of access to bicycle storage facilities.

A bicycle, also called a cycle or bike, is a human-powered, pedal-driven vehicle having two wheels attached to a frame, one behind the other. Bicycles are useful both for recreation (for touring, mountain biking, or physical fitness) and for transportation. Commuting by bicycle is increasingly popular.

However the bicycle is used, the end or beginning point of a bicycle trip is not always at home, so bicyclists frequently need to park their bicycles for long or short periods. Bicycles are popular targets for theft, due to their relatively low weight, portability, relative value and easy resale. Bicycle locks may deter theft, but, even when used properly, locks are often ineffective to stop bicycle theft.

Certain solutions have been suggested to make bicycle parking more secure. For example, fenced spaces have been developed as secure bicycle parking areas with various features for limiting access to the space, but they are not always theft-proof. In addition, even though bicycles are sturdy, they can become damaged if left out in the elements, and many bicycle parking areas are open air. Bicycle parking houses have been suggested to provide cover a bicycle and limit access to it. For example, U.S. Pat. No. 5,979,120, Parking House for Bicycles, discloses a circular bicycle parking and storage house in which bicycle stalls with fixed walls are positioned radially with the rear ends of the bicycles being directed toward the center axis of the house. The storage area of the house has at least one door and two floors, the inner floor being rotatable to bring a stall into alignment with a door.

U.S. Pat. No. 8,820,004, Bicycle Storage Container System, discloses a modular bicycle storage system in which a plurality of modular enclosures, each of which may be equipped with a locking door and tethered to a ground surface, may be fastened together, both vertically and horizontally if desired.

U.S. Pat. No. 11,203,883, Bicycle Storage Facilities And Computer-Based Control Of Access Thereto, one of the named inventors of which is a named inventor for this application, discloses a system for computer-based bicycle storage control having a bicycle storage container with storage compartments of varied volumes, a rotatable platform for aligning compartments with the container door, and a door assembly that allows a bicycle access into and out of a compartment but limits or prevents access to compartments adjacent to the accessed compartment when a door in the door assembly is aligned with the selected compartment.

Bicycle parking systems can be difficult to design given the size and asymmetries in shape (height/width/length) of commercially available bicycles, and the need to store as many bicycles as possible in as little space as possible. If the space to be apportioned to a selected bicycle is designed using the largest available dimensions of bicycles, the space may be over-large, limiting the number of bicycles that could be stored in the unit. If the space apportioned to a selected bicycle is too small, certain models of bicycles may not fit safely into it without the stored bicycle appropriating some of the space intended to be used by another bicycle, raising the risk of adjacent bicycles catching onto each other and/or causing harm to each other.

For example, FIG. 1 shows a first conventional hanging bicycle storage unit 10 (also known as the "unit 10"), secured to a wall 15. The unit 10, which is arranged to receive and store multiple bicycles 50 in a single row along the wall, has an upper support bar 12 and a lower support bar 14, both extending horizontally on the wall. A hoisting system 60 for each of the multiple bicycles 50 is arranged to receive and lift a bicycle 50 into storage in a single row on the unit 10. The hoisting system 60 has a hoist 62 attached vertically between the lower support bar 14 and upper support bar 12, and a lever 64 is attached at one end to the hoist 62 and at its other end to a knob 66.

In operation, a user wheels a bicycle 50 near to the hoisting system 60, positions the knob 66 of the hoisting system 60 between the spokes of a front wheel of the bicycle 50, and pushes the bike upward to lift the bicycle 50 up. The bicycle moves up easily with help from the hoist 62. When the lever 64 reaches a vertical position (knob 66 up), the bicycle is now in a wheels-up vertical orientation relative to the ground. The lever 64 clicks into a locked state relative to the hoist 62 (the user may apply an additional lock between the bicycle and the unit 10 for further security). To remove the bicycle, the user gently pulls the hanging bicycle away from the unit 10, which unlocks the lever 64, which moves downward as the user pulls the bicycle back from the unit 10 until both wheels are again on or near the ground or floor. The user then moves the knob 66 out of position between the spokes, and continues backing the bicycle away from the unit 10.

It can be seen that the unit 10 may have the following dimensions:
- the minimum loading width of the unit footprint to allow for loading bicycles onto the unit 10 is equal to the length of the longest bicycle expected to be loaded onto the unit 10, plus a small amount to accommodate the operation of the hoist system 60;
- the minimum storing width of the unit footprint to allow for storage of bicycles on the unit 10 is equal to the height of the tallest bicycle expected to be loaded onto the unit 10;
- the minimum height of the unit footprint to allow for storage of bicycles on the unit 10 is equal to the length of the longest bicycle expected to be stored on the unit 10, plus a selected distance that the designer wants to keep the bicycles off of the ground/floor;

The length of the unit is based on the number of bicycles that are expected to be stored on the unit 10, again, at the option of the designer.

Because bicycles have non-uniform geometries along their lengths, it is possible that components of adjacently stored bicycles (for example, the pedals, which are in similar locations on adjacent bicycles) might interfere with each other, potentially causing the bicycles to get jammed together so that bicycle storage and removal is made difficult or impossible; and damage to one or more bicycles may occur. In the past, hoisting systems such as shown in FIG. 1 have been staggered on the storage unit in a vertical high/low configuration in order for every other bicycle to be staggered vertically along the length of the hanging storage unit, to minimize the potential for bicycle components to clash. With staggering, which in the case of the unit 10 means alternated in height along the width of the unit 10, the bicycles hung on a storage unit may be stored more closely together, maximizing the bicycle storage capacity of the unit 10 while minimizing the potential for bicycle components in similar locations on adjacent bicycles to clash with each other. Thus, the non-uniform geometries of the bicycles along their lengths may be accommodated, and the length (and resultant storage capacity) of a hanging storage unit may be optimized by staggering the bicycles on the storage unit in a vertical high/low configuration, maximizing the number of bicycles to be stored and minimizing the length of the unit 10 and the potential of harm to neighboring bicycles, A second conventional hanging bicycle storage unit 20 (also known as the "unit 20") is shown in FIGS. 2A, 2B as being disposed on the ground or floor, or in certain embodiments, secured between the ground/floor 25 and a ceiling 27. The unit 20, which is arranged to receive and store multiple bicycles 50 in a double row across the unit 20, has a support post 26 extending vertically upward from the floor. Not shown in FIGS. 2A, 2B is an additional support post disposed on the floor, or in certain embodiments, secured between the ground/floor and the ceiling. The unit 20 also has upper support bars 22a, 22b and lower support bars 24a, 24b, all extending horizontally parallel to the floor and secured perpendicularly to the support post 26 and the other support post (not-shown). A plane (also not shown) may be visualized between the support posts that is parallel to the support bars 22a, 22b, 24a, 24b, and that bisects the unit 20.

The hoisting system 60 shown in FIG. 1 may also be employed on the unit 20, with a hoisting system 60 for each of the multiple bicycles 50 to be received and lifted into storage in the double row along the length of the support bars 22a, 22b and support bars 24a, 24b on the outer side surface of the support bar (the outer side surface being bicycle-facing and opposite to the inwardly facing surface of the support bars, which face the central plane of the unit 20). As in the unit 10, a hoist 62 is attached vertically on the unit, with a hoist between and on the outer surface of the support bars 24a, 24b, and the support bars 22a, 22b; and a lever 64 may be attached at one end to the hoist 62 and at its other end to a knob 66. The user hangs the bicycle on the unit 20 and removes it in the same manner described above for unit 10.

The unit 20 is arranged to store multiple bicycles 50 in a double row, the bicycles arranged on the unit 20 and positioned front wheel up to front wheel up perpendicularly to the support bars and parallel relative to the support post. FIG. 2B shows the positioning of the bicycles on the unit 20, with the footprint of the bicycles 50 parked at the unit 20 front wheel to front wheel shown in dashed lines and the footprint of the bicycles 50 during storage in solid lines. The loading width of the unit 20 would be 2.5 m+2*1.3 m=5.1 m (up to 5.2 m), with 1.3 m being the amount of additional space that a bicycle parked on the ground requires at the onset of the loading process for or at the end of the unloading process.

FIG. 2B shows the interference of handlebars that is possible in the unit 20 that may be prevented or minimized with a vertical high/low configuration of the bicycles, with every other bicycle in each row staggered high or low again to accommodate the non-uniform geometries of the bicycles along their lengths while minimizing the length of the footprint of the second conventional hanging bicycle storage unit when fully loaded.

It can be seen that the unit 20 may have the following dimensions:

the minimum loading width of the unit footprint to allow for loading bicycles onto the unit 20 is equal to double the length of the longest bicycle expected to be loaded onto the unit 20 (twice the distance D20), plus the distance between the support bars 24a, 24b (including the widths of the support bars) (as shown in FIG. 2B, the minimum loading width of the unit 20 is 2.50-2.60 meters);

the minimum storing width of the unit footprint to allow for storage of bicycles on the unit 20, which is 2.5-2.6, calculated as equal to the double the height of the tallest bicycle expected to be loaded onto the unit 20 (twice the distance D21), plus the distance between the support bars 24a, 24b (including the widths of the support bars) (bikes of taller riders can have a height of about 1.2 m); and as with unit 10, the length of the unit footprint for the unit 20 is based on the number of bicycles that are expected to be stored on the unit 10, again, at the option of the designer, with the length (and resultant storage capacity) of a hanging storage unit selected to minimize the potential for harming adjacent bicycles or causing jams on the unit 20 by assigning additional width to the bicycle storage footprint for each bicycle or by staggering the bicycles on the storage unit in a vertical high/low configuration so that a certain amount of the bicycle storage footprint for adjacent bicycles is shared.

It is desirable to have a simple, convenient system for parking and secure storage of bicycles of multiple sizes in as little space as possible. While hanging bicycle storage units like unit 10 and unit 20 have been optimized in their lengths to increase the storage capacity of such units, little attention has been paid to reducing their storing and loading widths so that they may be practically placed in locations as apartment complexes, office parks, or public transportation stops or stations, on sidewalks, or in parks or on-street parking or parking lots or in tourist areas, where available space may be at a minimum.

Therefore, it is desirable to reduce a bicycle storage unit's minimum loading and storing widths. While one way to reduce a bicycle storage unit's minimum loading width would be to redesign the standard bicycle so that its length is reduced, it may not be feasible to so redesign the standard bicycle. Similarly, while one way to reduce a bicycle storage unit's minimum storing width would be to redesign the standard bicycle so that its height is reduced, it may not be feasible to so. Therefore, it is desirable to develop a bicycle storage unit in which its minimum loading width and/or its minimum storing width is minimized without redesigning the standard bicycle.

It is further desirable to minimize the loading and storing widths of the bicycle storage unit 10 while accommodating the non-uniform geometries of bicycles along their widths and lengths.

SUMMARY

Methods and systems for storing a plurality of bicycles in asymmetrical, shared individual storage spaces are herein disclosed.

A bicycle storage unit, also referred to herein as a hanging bicycle unit, a hanging bicycle storage unit, or simply as a unit, in which the bicycle may be hung, or suspended, from support posts, may have generally parallel and horizontal first and second base frame bars spaced apart from each other across a support base and secured directly or indirectly to each other; and a plurality of generally vertical and parallel support posts extending perpendicularly from the base bottom frame bars, also known as "base frame bars," and "bottom frame bars, and "bars." The support posts, also known as "support poles," may be arranged to store and suspend bicycles in a double row along the length of the unit, with a first set and a second set of support posts secured to the first and second base frame bar respectively, so that a first row of bicycles may be stored on a first side of the bicycle storage unit and a second row of bicycles may be stored on a second side of the bicycle storage unit. The bicycles may be suspended on an inwardly facing surface of support posts, with the inwardly facing surface being a surface of a selected support post that faces the space between the first side and the second side.

Adjacent support poles in the first set may be spaced apart on the first side a selected first distance to allow at least a portion of a second bicycle to be passed therebetween for receiving by the one of the second set of support poles, and adjacent support poles in the second set are spaced apart on the second side a selected second distance to allow at least a portion of a first bicycle to be passed therebetween for receiving by the one of the first set of support poles. One of the first set of support posts may be positioned on the first base frame bar at a first post location, which is across the space between the first side and the second side from a second post location on the second base frame bar, the second post location positioned between the adjacent support posts in the second set. In certain embodiments, the first post location may be positioned such that, when the first bicycle is moving across the space through the adjacent support posts in the second set, and a wheel of the first bicycle is in line with the first post location, one pedal of the first bicycle is positionable behind one of the adjacent support posts in the second set, and another pedal of the first bicycle is positionable within the space between the first side and the second side.

In further embodiments, one of the first set of support poles may be asymmetrically spaced between the adjacent support poles in the second set across the space between the first side and the second side to limit an extent of distance that a front wheel of the first bicycle is movable across the space from the one side of the bicycle storage unit to the other side. In still further embodiments, the asymmetric spacing may be based on securing one of the adjacent support poles on the second base frame bars an amount of distance selected to cause a pedal of the first bicycle, when the first bicycle is moved through the adjacent support poles in the second set to come to engagement with the one of the first set of support poles, to be positioned and brought to rest behind the one of the second set of support poles.

In other embodiments, the space between the first side and the second side across which the first bicycle is movable may have an extent of distance that the first bicycle is movable across the space from the second side without interfering with components of one or more bicycles suspended from the support poles on the second side. In further embodiments, the extent of distance may be based on dimensions of the first bicycle. In other further embodiments, the extent of distance may be selected as the length across the space from the second side, at which, when the first bicycle is moving through the adjacent support posts in the second set, one pedal of the first bicycle is positioned behind one of the adjacent support posts in the second set, and another pedal of the first bicycle is positioned within the space between the first side and the second side.

In other embodiments, the first post location may be positioned such that, when the first bicycle is moving across the space through the adjacent support posts in the second set, and a wheel of the first bicycle is in line with the first post location, one pedal of the first bicycle is positionable behind one of the adjacent support posts in the second set, and another pedal of the first bicycle is positionable within the space between the first side and the second side.

In certain embodiments, hoisting systems may be associated with the support posts, wherein a selected support post has a selected hoisting system associated therewith and is arranged to receive a selected bicycle and lift the selected bicycle into vertical storage in a front wheels-up position, on the selected support post.

In other embodiments, the unit may have bicycle hanging components on the support poles to secure bicycles to surfaces of the selected support posts that face the space between the first side and the second side, such surfaces referred to herein as inwardly facing surfaces of the support posts. The bicycle hanging components may be staggered at selected heights on the support poles to accommodate the non-uniform geometries of the bicycles along their lengths and widths.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiment(s) of the invention and together with the description, serve to explain the principles of the invention.

BRIEF DESCRIPTION OF THE DRAWINGS

FIG. 2B is a diagrammatic top plan view of the unit 20 of FIG. 2A, showing in dashed lines the width of the footprint of the bicycle 50 parked at the unit 20 front wheel to front wheel and in solid lines the storing width of the unit 20;

FIGS. 5A-5E are views of a diagrammatic representation of a second illustrative but not necessarily preferred embodiment of a bicycle storage unit 500, which is arranged to store three bicycles, two bicycles on one side of the unit and one bicycle on the other, with:

FIG. 5A being a top plan view of the unit 500,

FIG. 5B being a front perspective view of the unit 500,

FIG. 5C being a diagrammatic rear elevation view of the unit 500,

FIG. 5D being a diagrammatic side elevation view of the unit 500, and

FIG. 5E being a rear perspective view of a unit 500 to which hoisting systems are attached;

FIG. 6 is a side perspective view and FIG. 7 is a diagrammatic side elevation view of other illustrative but not necessarily preferred embodiments of a bicycle storage unit of the current invention;

FIGS. 8A-8C are diagrammatic rear elevation views of a diagrammatic representation of the unit 500 in operation, with:

FIG. 8A showing the unit 500 empty of bicycles,

FIG. 8B showing the unit 500 storing one bicycle, and

FIG. 8C showing the unit 500 storing two bicycles;

DETAILED DESCRIPTION

Reference will now be made in detail to the present exemplary embodiments, examples of which are illustrated in the accompanying drawings. Wherever possible, the same reference numbers will be used throughout the drawings to refer to the same or like parts.

Figure 1:
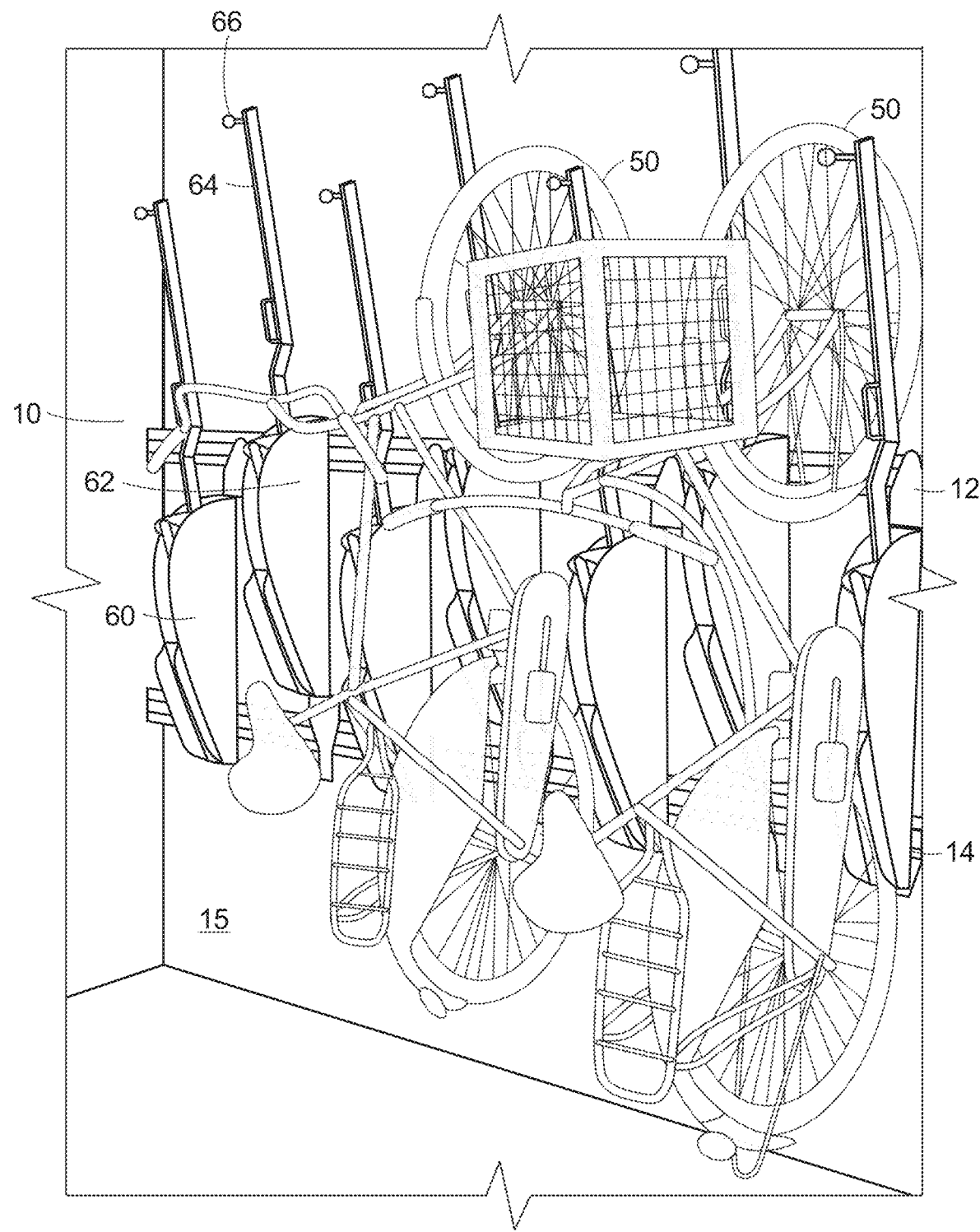
FIG. 1 is a perspective view of a first conventional hanging bicycle storage unit 10 (also known as the "unit 10"), the unit 10 secured to a wall 15 and arranged to receive and store multiple bicycles 50 in a single row along the wall 15.
Figure 2A:
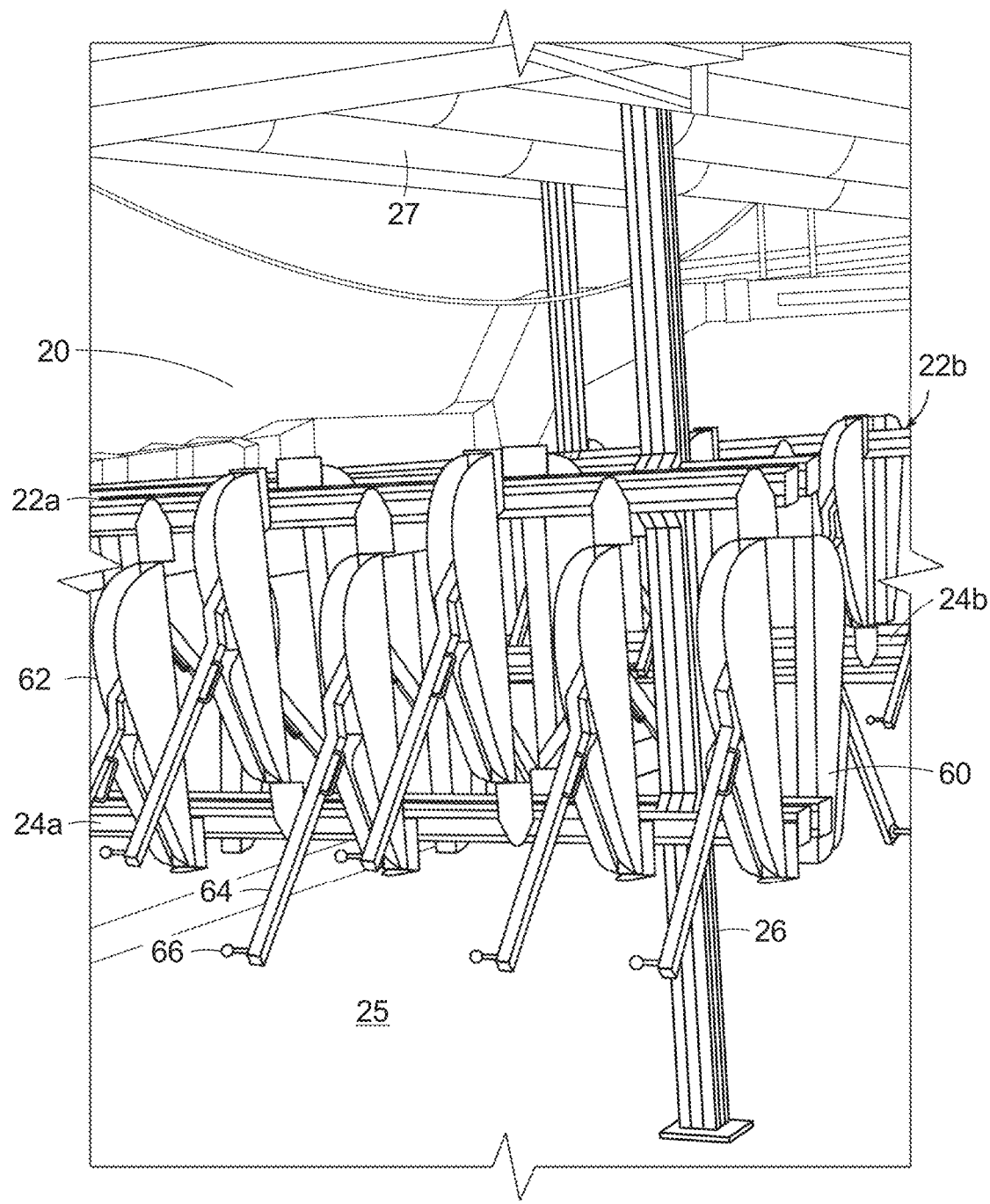
FIG. 2A is a perspective view of a second conventional hanging bicycle storage unit 20 (also known as the "unit 20") disposed on a floor 25, the unit 20 arranged to store multiple bicycles 50 in a double row.
Figure 3A:
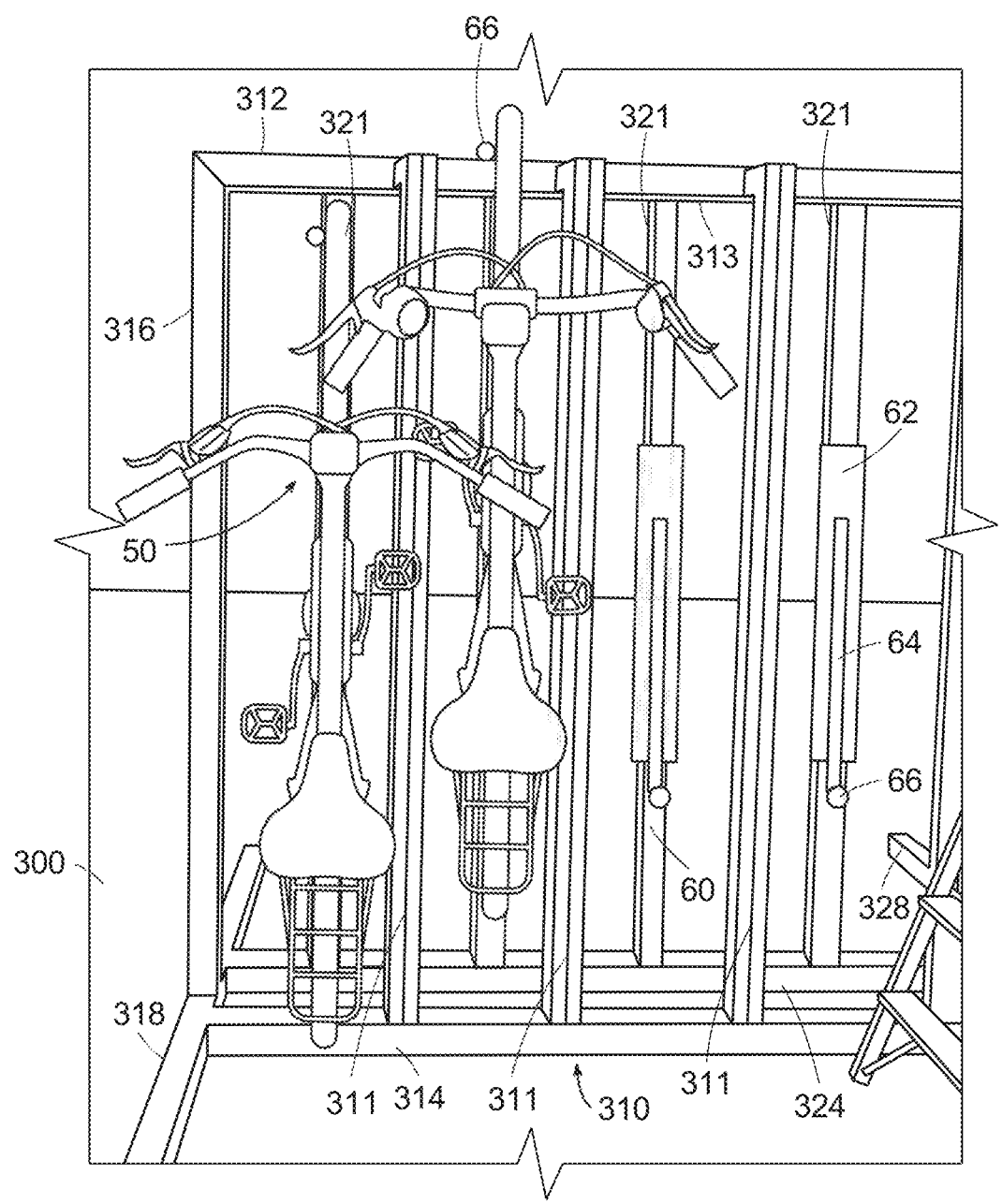
FIG. 3A is a side perspective view of a bicycle storage unit 300 of an illustrative but not necessarily preferred embodiment of the current invention, is which certain bicycles 50 are suspended and stored in asymmetrical, shared individual storage spaces thereon, using hoisting systems 60 attached to the support posts, respectively.
Figure 3B:
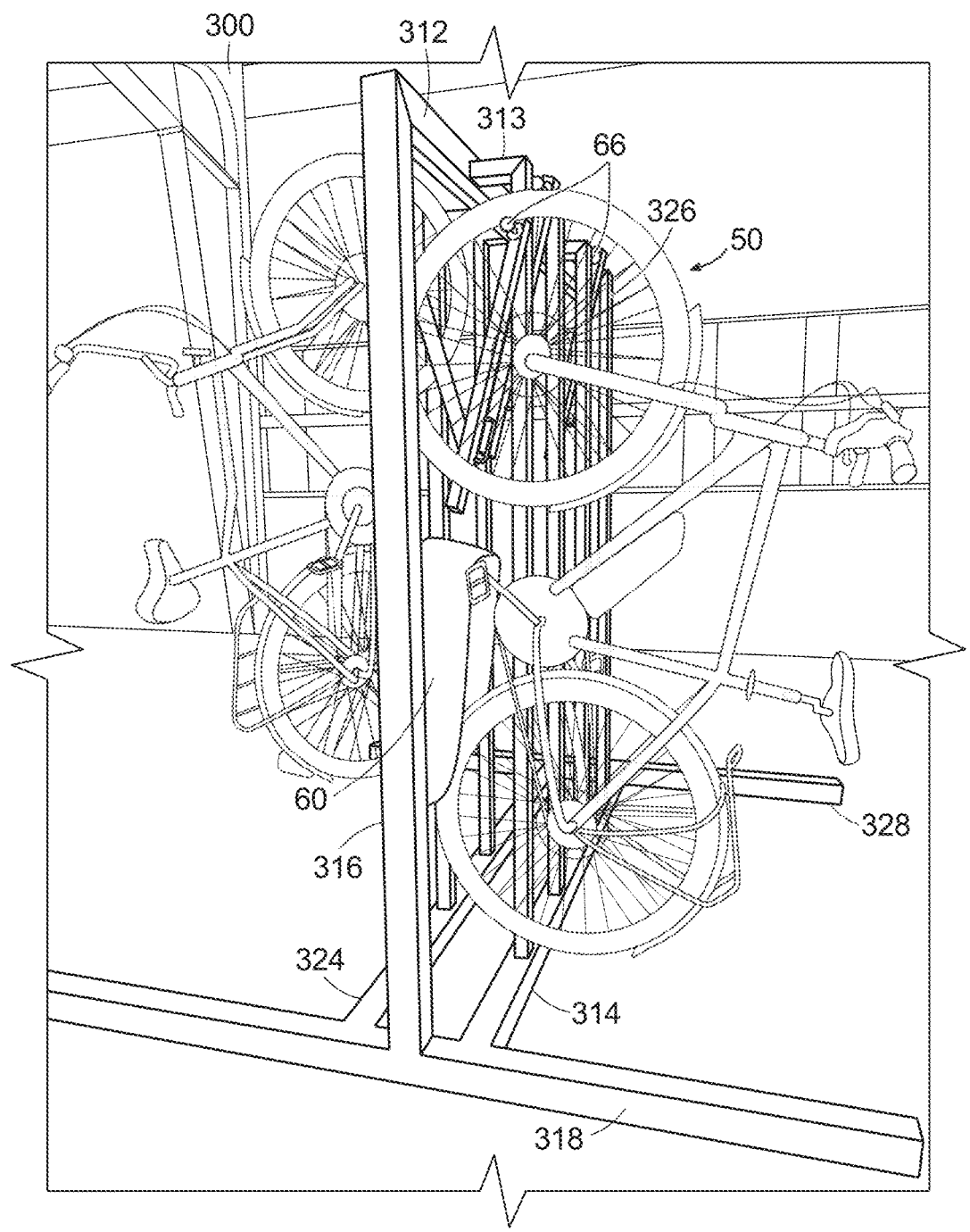
FIG. 3B is a front perspective view of the bicycle storage unit 300 shown in FIG. 3A, with bicycles 50 suspended and stored thereon using hoisting systems 60 attached to the support posts.

A bicycle storage unit 300 according to the present invention will now be described in detail with reference to FIGS. 3A, 3B, of the accompanying drawings. The unit 300, which may contain bicycle storage for a fee, may be used to temporarily, securely, and releasably park and store bicycles, such as bicycles 50. In certain embodiments, the unit may be a standalone rack open to the air (as shown in FIGS. 3A, 3B), or a covered container, storage house, storage condo, or other bicycle storage facility with roofs and/or side walls. A unit 300 may be located at any convenient location, such as apartment complexes, office parks, or public transportation stops or stations, on sidewalks, or in parks or on-street parking or parking lots or in tourist areas.

The unit 300 may have a generally horizontal top frame bar 312, generally horizontal bottom frame bars 314, 324; a generally vertical front frame bar 316, a generally vertical rear frame bar 326, and generally horizontal base legs 318, 328, which are all joined together to form a generally rectangular frame 310 with a stable support base and forming a stable support base:

- the base legs 318, 328 spaced apart from and generally parallel with each other;
- the bottom frame bars 314, 324 spaced apart from and generally parallel with each other and attached generally perpendicularly at their ends to the base legs 318, 328, respectively;
- the front frame bar 316 spaced apart from and generally parallel with the rear frame bar 326 and attached generally perpendicularly at their bottom ends to the base legs 318, 328, respectively, with a central plane (also not shown) that may be visualized between the front frame bar 316 and the rear frame bar 326 and that bisects the unit 300; and
- the top frame bar 312 generally perpendicular with and attached at its ends to the top ends of the frame bars 316, 326, the top frame bar 312 generally parallel with the bottom frame bars 314, 324.

It is to be understood that the bars so described may be of any suitable geometry and material so long as the resulting frame is stable; and the support base may be securable to the floor, or securable to both the floor and a ceiling, at the discretion of the unit designer. Further, it may be understood that, instead of base legs, the support base may be formed of any suitable conventional design and materials, such as rectangular or circular planes or blocks.

In certain embodiments, the unit 300 may be enclosed to protect the unit and the bicycles stored thereon completely from the elements; in other embodiments, the unit may be partially enclosed to allow ventilation while still providing partial protection from the elements. In further embodiments, vents, windows that open, or other ventilation features may be provided in the enclosure walls, to be opened or closed automatically or manually at the option of the designers and/or the facilities management.

The unit 300 may also have generally vertical support posts 311 perpendicularly secured between the top frame bar 312 and the bottom frame bars 314, 324; and the unit 300 have generally vertical support posts 321 perpendicularly secured between the top frame bar 312 and the bottom frame bar 324. In the illustrative but not necessarily preferred embodiment of FIGS. 3A, 3B, and as shown in FIG. 3A, the support posts, also known as posts, support poles, or poles, may define the storage spaces for the bicycles, with the unit 300 having a hoisting system, such as a conventional hoisting system 60, associated with each of the support posts in order to provide a hoisting system 60 for each of the multiple bicycles 50 to be received and lifted into storage in the double row along the length of the unit 300.

The hoisting system 60, shown representationally in FIG. 3A, may be any conventional hoisting system. It may have components such as a hoist 62, which may be attached vertically on the inwardly facing surface of a support post, the inwardly facing surface facing the central plane of the unit 300, with hoisting system 60 also having a hoisting lever 64, which may be attached at one end to the hoist 62 and at its other end to a knob 66.

Figure 4:
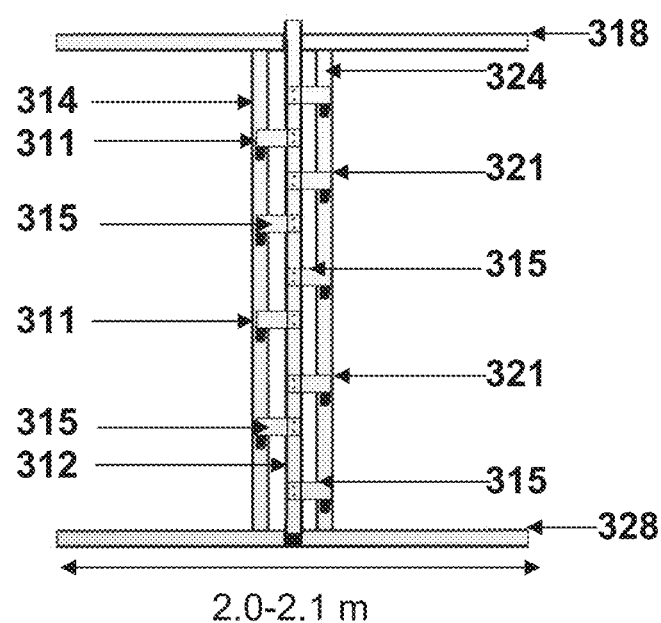
FIG. 4 is a top plan view of a diagrammatic representation of the bicycle storage unit 300.

The bottom ends of the support posts 311, 321 may be directly secured to the top surface of the bottom frame bars 314, 324, respectively, for example through welding or with bolts. As shown in FIG. 3B, the top ends of the support posts 311, 321, spaced a selected distance from the top frame bar 312, may be secured to the sides of the top frame bar 312 through a series of spacer bars 313, 323 secured between the side surfaces of the top frame bar 312, for example through welding or with bolts. Alternatively, as shown in FIG. 4, the top end of a support post 311, 321 may be secured to the top frame bar 312 through an elbow connector 315, secured at one end to the top surface of the top frame bar 312, for example as shown with bolts, and at its other end to a surface of a support post 311, 321. In this embodiment, the elbow connectors 315 function as spacer bars 313, 323.

FIGS. 5A-5E show a second illustrative but not necessarily preferred embodiment of a hanging bicycle storage unit 500, which may be seen as a simplified version of the unit 300, with two spaces available for storing bicycles on one side of the unit and one space available for storing a bicycle on the other side, and without a top frame element and side frame elements.

Figure 5A:
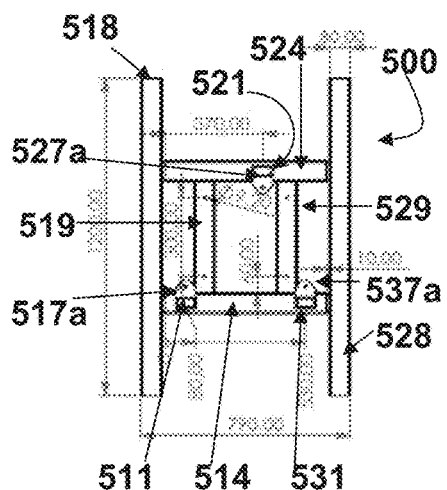
Figure 5B:
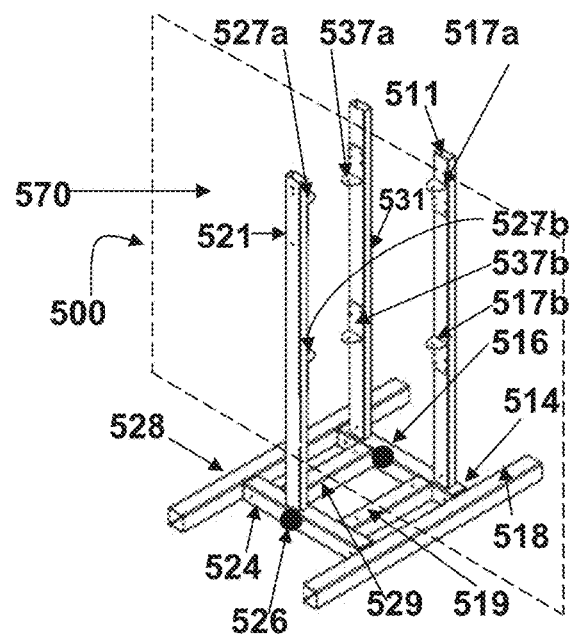

Turning to FIG. 5A and FIG. 5B, similarly to the unit 300, the unit 500 may have generally horizontal bottom frame bars 514, 524 and generally horizontal base legs 518, 528, which are all joined together to form a stable support base, with the bottom frame bars 514, 524 spaced apart from each other and the ends of the bottom frame bars 514 attached perpendicularly to the base legs 518, 528. Spacer bars 519, 529 may be attached perpendicularly between the bottom frame bars 514, 524 to further stabilize the support base.

The unit 500 may also have generally vertical support posts 511, 531 extending perpendicularly from the bottom frame bar 514, 524, and a generally vertical support post 521 extending perpendicularly from the bottom frame bar 524. A plane 570, shown in dashed lines, may be visualized as extending between the midpoints that bisect the spacer bars 519, 529 and base legs 518, 528 and as extending parallel to the support posts 511, 521, 531.

The support posts may also have hoisting systems associated therewith to provide a selected hoisting system for a bicycle 50 to be received and lifted into storage on a selected support post, with the bicycles stored in a double row along the length of the unit 500. FIG. 5E shows hoisting systems 60 associated with the support posts 511, 521, 531, the hoisting systems attached to the support posts with a pair of angle connectors, one above the hoist 62, and one below the hoist 62. One of the pair of angle connectors, hanging component 527a, may be seen attached to the support post 521.

For simplicity of illustration, the hoisting systems 60, which, as noted above, may be any conventional hoisting system, are not shown in FIGS. 5A-5D, their locations represented shown by the pair of angle connectors on each of the vertical support posts 511, 521, 531 that are used to attach the hoisting system to the support poles. The angle connector pairs, also known herein as "hanging components," may be attached vertically on the inwardly facing surfaces of the support posts, the inwardly facing surface of a support post facing the central plane 570 of the unit 500, with the hanging components 517a, 517b, in this embodiments in the form of an angle connector pair, secured to the inwardly facing surface of vertical support post 511; the hanging components 527a, 527b, also in this embodiment in the form of an angle connector pair, secured to the inwardly facing surface of the vertical support post 521; and the inwardly facing surface of the hanging components 537a, 517b secured to the vertical support post 531, all arranged to attach the hoisting system 60 to the posts.

Figure 5C:
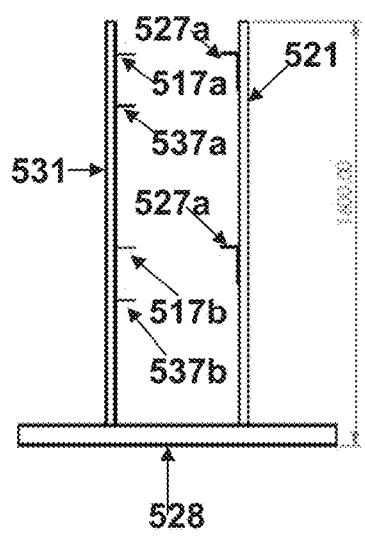
Figure 5D:
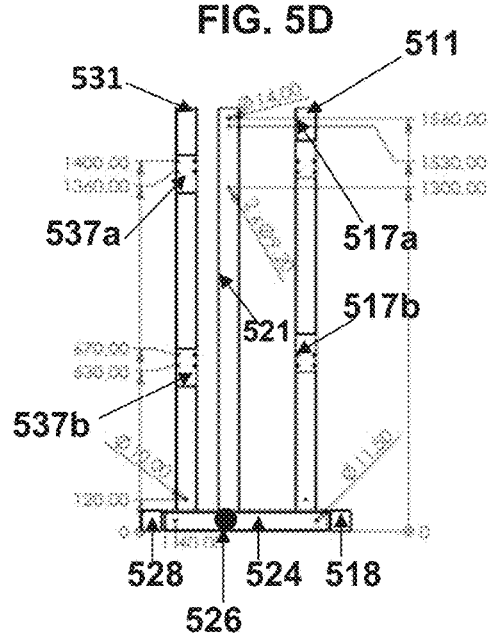
Figure 5E:
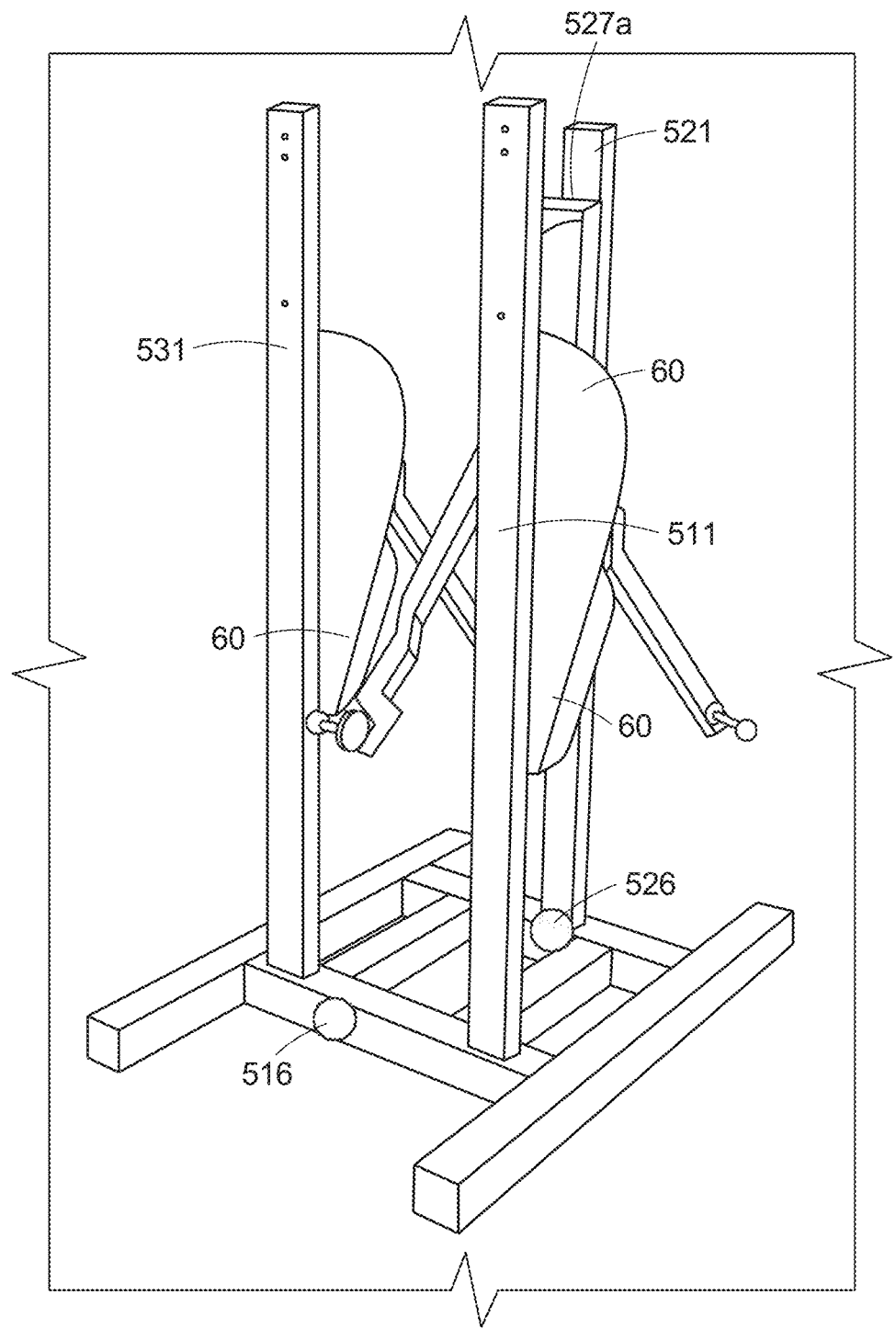

As shown in FIGS. 5C, 5D, and 5E, the angle connector pairs are staggered along the length of the support posts 511, 521, 531 in order to stagger the bicycles along the height of the unit so as to accommodate the non-uniform geometries of the bicycles along their lengths. In addition, the positioning of the hoisting systems on the inwardly facing surfaces of the support posts allows the stored bicycles, especially their wheels, to extend across the central plane, allowing portions of the stored bicycles on both sides of the unit 500 to share storage space. Further, as described in further detail below, the support posts may be asymmetrically spaced along the frame bars 514, 524 to further accommodate the non-uniform geometries of the bicycles along their widths.

Figure 8A:
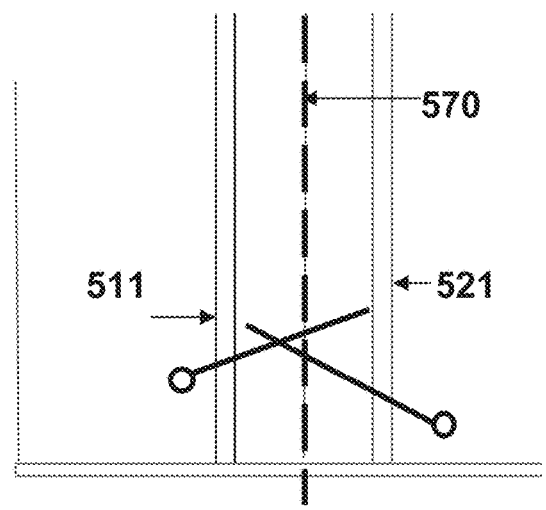
Figure 8B:
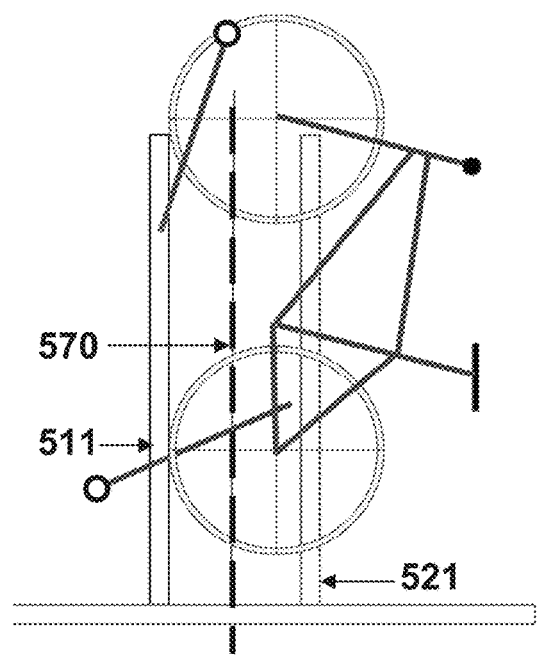
Figure 8C:
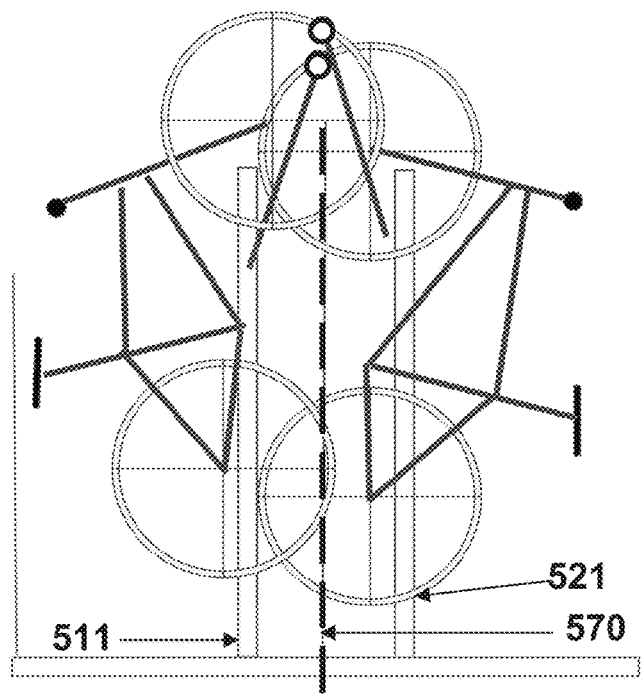

As shown in FIGS. 8A-8C, which are diagrammatic representations of the unit 500 in operation, with FIG. 8A showing the unit 500 empty of bicycles, FIG. 8B showing the unit 500 storing one bicycle, and FIG. 8C showing the unit 500 storing two bicycles. It can be seen, especially in FIGS. 8B, 8C, that the positioning of the hoisting systems on the inwardly facing surfaces of the support posts 511, 521 allows the stored bicycles, especially their wheels, to extend across the central plane 570, allowing portions of the stored bicycles on both sides of the unit 500 to share storage space. Further, it can be seen, especially in FIG. 8C, that the staggering of the heights of the bicycles hanging on the unit and facing each other across the unit reduces the likelihood of corresponding components of the bicycles (for example, the pedals) from interfering with each other.

Figure 9A:
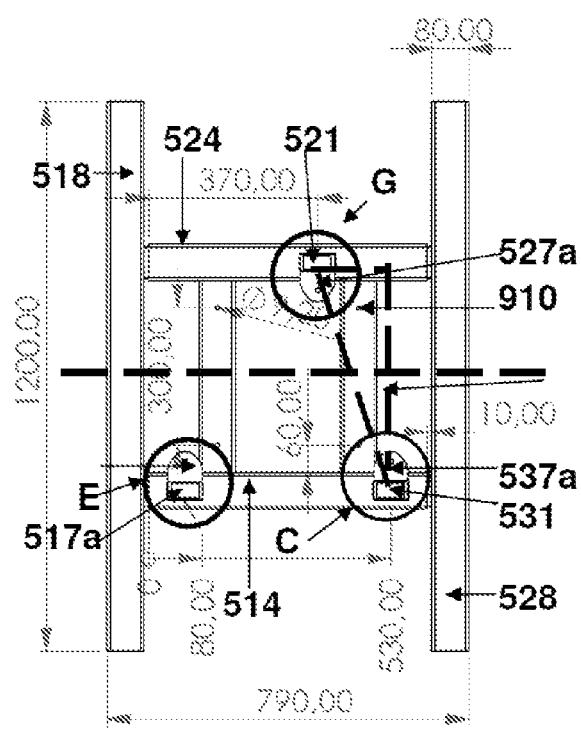
FIG. 9A is a more detailed top plan view of the unit 500 shown in FIG. 5B, illustrating, for the unit 500, the positioning of hanging components 517a, 527a, 537a and the vertical support posts 511, 521, 531 relative to each other to maximize the distance 'A' between the hanging components on the support posts 511, 521 and to minimize the loading width of the bicycle storage unit 500.
Figure 9B:
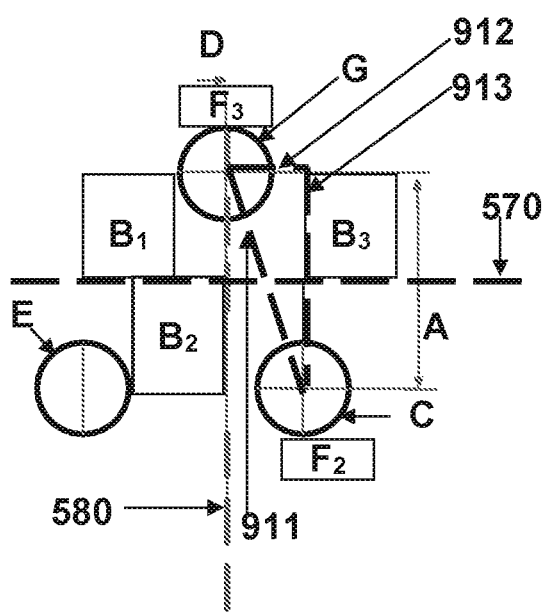
FIG. 9B is a more simplified top plan view of the unit 500 shown in FIG. 7A, illustrating the positioning of the hanging components 517a, 527a, 537a and the vertical support posts 511, 521, 531.

As shown in FIGS. 9A-9B, interference of components of the bicycles with each other may be further reduced by spacing the support posts asymmetrically along the bottom frame bars relative to the support posts on the other side of the unit. The asymmetric positioning of the support posts, in which a first post location 526 (which may be seen in FIGS. 5B, 5D, and 5E) that is across the space between a first side and a second side from a second post location 516 (FIGS. 5B and 5E) on the second base frame bar between adjacent support posts in the second set, prevents the pedals of adjacent bicycles on both sides of the unit 500 from interfering with each other. FIG. 9A, illustrating the top of the unit 500 shown in FIG. 5A, emphasizes the positioning of the hanging components 517a, 527a, 537a and the non-uniform spacing of the support posts 511, 521, 531 relative to each other that may result in the minimization of the loading width of the bicycle storage unit 500 while preventing interference of components of the bicycles with each other.

It may be seen that the vertical support post 521 is positioned on the frame bar 524 so that a first hanging component 527a (circled at G on FIG. 9A) on the bicycle storage unit 500 is closer in distance projected to the plane defined by the ground or floor to a second hanging component 537a (circled at C on FIG. 9A) than the first hanging component 527a is to a third hanging component (circled at E on FIG. 9A).

In the embodiment of the unit 500 shown in FIG. 9B, the loading width of the bicycle storage unit 500 may be minimized by maximizing the distance A between the support posts 531, 521, where A is shown in FIG. 9B as the length of a selected leg of the orthogonal triangle 910 represented in dashed lines and defined by a projection on the ground of the following lines:

- a first line segment 911 (represented in dashed lines) between:
  - the location of the hanging component 537a on or near the inwardly facing surface of the support post 531 (for example, the center point of circle C), and
  - the location of the hanging component 527a on or near the inwardly facing surface of the support post 521 (for example, the center point of circle G),
- a second line segment 912 (represented in dashed lines) defined by a line parallel to the inwardly facing surface of the bottom frame bar 524 and extending from the location of the hanging component 527a on the inwardly facing surface of the support post 521 (for example, the center point of circle G), and
- a third line segment 913 (represented in dashed lines) defined by a line parallel to the inwardly facing surface of the base leg 528 and extending from the location of the hanging component 537a on the inwardly facing surface of the support post 531 (for example, the center point of circle C) to its intersection with the second line segment.

The selected leg (the length of which may be used to maximize the distance A between the support posts 531, 521) is the third line segment 913 of the orthogonal triangle 910 that is parallel to the inwardly facing surface of the support post 528.

It can be seen that, when the distance A is so defined, the position on the vertical post of the first hanging component 527a (circled at G) on the bicycle storage unit 500 is closer to the second hanging component 537a (circled at C) on the bicycle storage unit 500 than to a third hanging component 517a (circled at E). By so positioning the support post 521, the distance A (shown in FIG. 7B) may be increased, which, as shown below, allows the front wheel of a bicycle being stored on support post 521 to extend across the central plane 570 and so reduce the loading width and storing width of the unit 500. An increase in the distance A allows the bicycles to move closer to each other, sharing more storage space, thus reducing the overall storing width of the bicycle storage unit 500 when two bicycles are hung facing each other on opposite sides of the central axis 570.

However, once the distance A becomes too great, components of the two bicycles in storage on the unit 500 may hit each other, causing harm to the bicycles or causing them to entangle. In one embodiment, collision or entanglement may be avoided by capping the length of the distance A to a length at which one pedal of a bicycle being suspended on the support pole 521 is positioned and brought to rest in an area (shown in FIG. 9B as area $B_2$) between the support poles 511, 531 that extends to or slightly beyond the central plane 570 and is generally positioned between the support pole 511 and a perpendicular central axis 580 that extends parallel to the central plane 570, while the other pedal is positioned and brought to rest in an area (shown in FIG. 9B as area $F_2$) slightly behind the support pole 531.

It can further be seen in FIG. 9B that, in determining the distance A, when a bicycle is positioned to be suspended from support pole 531, the front wheel of the bicycle may extend the distance beyond the central axis 570 to a length at which one pedal of the bicycle being suspended is positioned and brought to rest in an area (shown in FIG. 9B as area $B_3$), while the other pedal is positioned and brought to rest in an area (shown in FIG. 9B as area $F_3$) slightly behind the support pole 521. The asymmetry of the placement of the support poles in the unit allows for the pedals of adjacent bicycles to be kept away from each other.

It can be seen in FIG. 9B that, because the bicycle may be positioned across the support pole 531,511 so that the other pedal is brought to rest slightly behind the support pole 531, the dimensions of the bicycle, specifically the perpendicular distance from the bicycle frame to the pedal plus the length of the pedal (which corresponds to the length of the leg of the orthogonal triangle that is parallel to the inwardly facing surface of the bottom frame bar 524) may control the perpendicular distance between the parallel support poles.

Thus, in a hanging bicycle unit in which bicycles are suspended in a double row from parallel support poles across a central axis, limiting the distance that a front wheel of a first bicycle to be suspended from a first support pole may extend across the central axis to a distance that is based on the dimensions of the bicycles to be suspended, and are further based on the dimensions of the pedals of the bicycles.

Figure 10A:
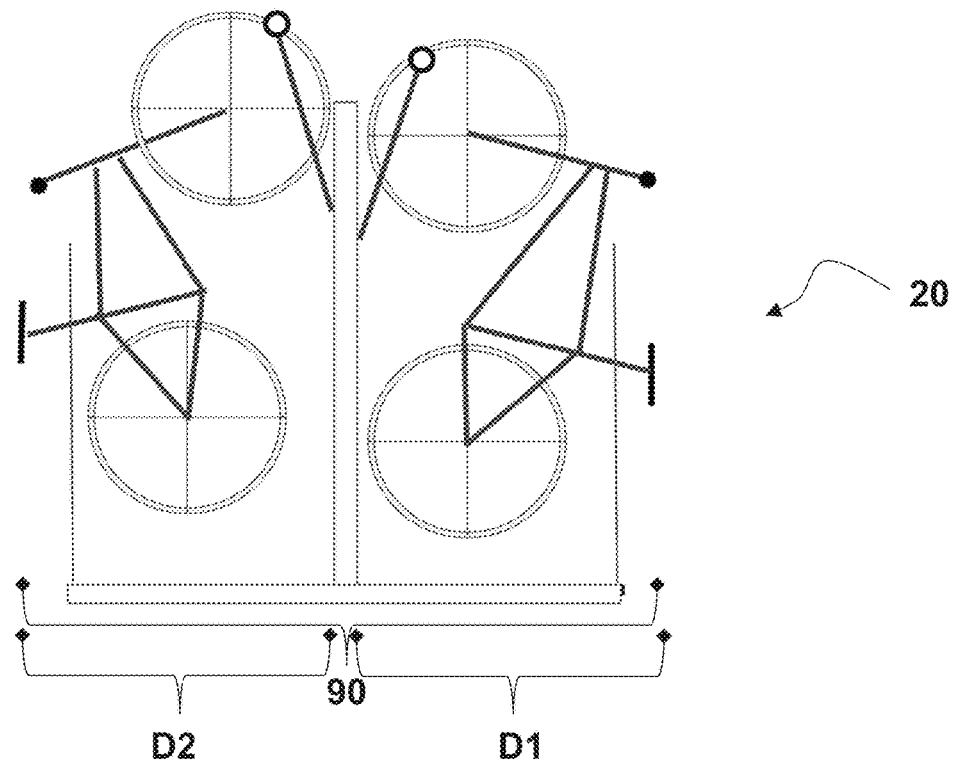
FIGS. 10A and 10B are simplified diagrammatic rear elevation views of the second conventional hanging bicycle storage unit 20 and the hanging bicycle storage unit 500, respectively, comparing the footprints of the fully loaded units 20, 500, in particular, the minimum storing widths of the units 20, 500 that will accommodate the loading of a bicycle on either side of the units.
Figure 10B:
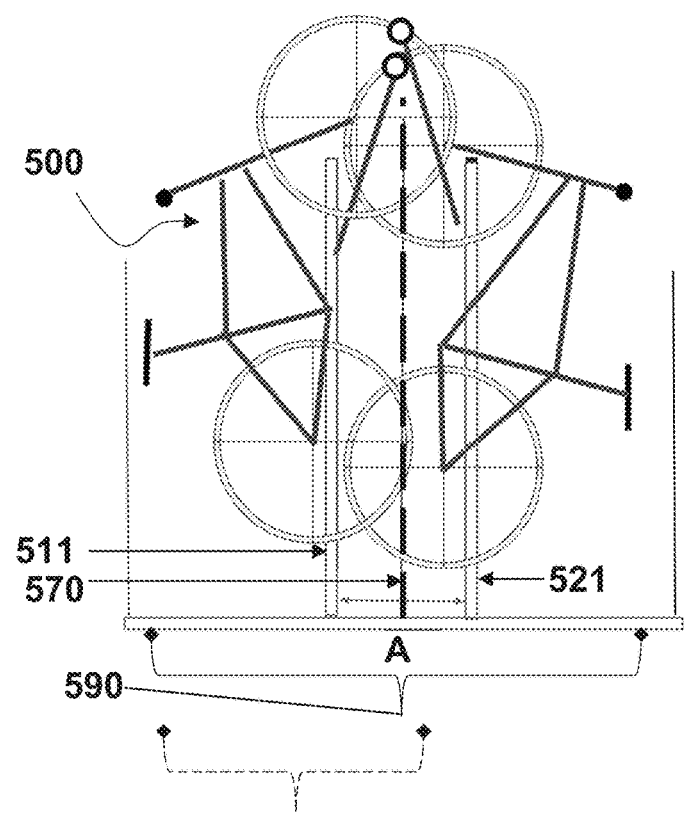

A comparison of a conventional hanging bicycle storage unit (such as unit 20) and an embodiment of the hanging bicycle storage unit of the instant invention (such as unit 500) shows that the minimum storing width 90 of the conventional unit 20 is much larger than the minimum storing width 590 of the conventional unit 20. As illustrated in FIGS. 10A, 10B, the minimum storing width 90 of the conventional unit 20 is equal to the sum of the heights D1 and D2, plus the distance between the support bars 24a, 24b (including the widths of the support bars), but no less than double the height of the tallest bicycle expected to be loaded onto the unit 10. The minimum storing width 590 of the unit 500 is equal to less than the sum of the heights D1 and D2. As noted above, the loading width of the unit 20 would be 2.5 m+2*1.3 m =5.1 m (up to 5.2 m), with 1.3 m being the amount of additional space that a bicycle parked on the ground requires at the onset of the loading process for or at the end of the unloading process. As shown in FIG. 10A, the loading width of the unit 500 would be D1+D2=2.5-2.6 m, which is considerably less than the loading width of the unit 20.

Also, it can be seen that the distance A may be based on the dimensions of a bicycle based on the length of the pedal spindle. In certain embodiments, the distance A is further based on the pedals of a bicycle that has the largest dimensions of bicycles anticipated to be stored in the unit 500.

Figure 11:
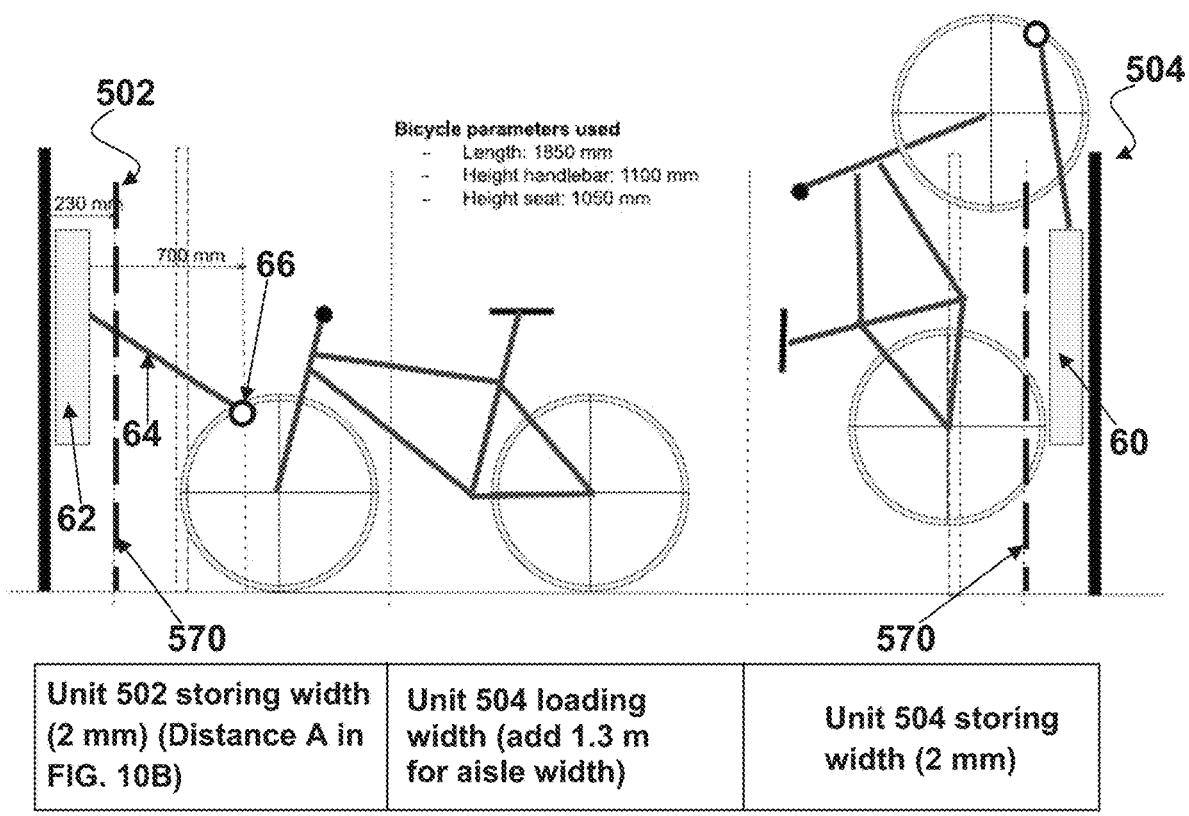
FIG. 11 are diagrammatic side elevation views of a bicycle being loaded onto hanging bicycle storage units 502, 504, with each bicycle having the largest dimensions of bicycles anticipated to be stored in the units 502, 504.

FIG. 11 shows the dimensional parameters for a bicycle that may be used to design an illustrative but not necessarily preferred embodiment-of the hanging bicycle storage units 502, 504:

- Length: 1850 mm;
- Height handlebar: 1100 mm;
- Height seat: 1050 mm; and
- Pedal width: up to 250 mm perpendicular from center of bike frame.

For a hanging bicycle storage unit arranged to store bicycles having such parameters, the unit parameters may be:

- From support pole to central axis 570: 230 mm;
- Unit storing width: 2 m (equal to distance A of FIG. 10B); and
- Loading width (add 1.3 m for aisle width).

Although the disclosed components have been described above as being separate units, one of ordinary skill in the art will recognize that functionalities provided by one or more units may be combined. As one of ordinary skill in the art will appreciate, one or more units may be optional and may be omitted or changed from implementations in certain embodiments. For example, the manner of high/low staggering of the suspended bicycles on a storage unit may be selected at the option of the designer.

In the configuration shown in the embodiment of unit 500, the support pole 521 is paired with the support pole 531, so that the poles 521, 531 are secured to the horizontal bottom frame bars 544, 514, respectively, at a shorter distance than are the poles 521, 511. In so doing, the unit 500 is arranged to position and bring to rest one of the pedals of the bicycle to be suspended from the support pole 521 slightly behind the support pole 531, and to position and bring to rest one of the pedals of the bicycle to be suspended from the support pole 531 slightly behind the support pole 521. A review of FIG. 5B shows that, when compared to support pole 511, the hanging component 517*a* is vertically higher from the ground/floor than the angle connector 537*a* of the support pole 521. At the choice of the designer, the poles 521, 511 could be paired together so that they are geometrically at a shorter distance than are the poles 521, 531, so that one of the pedals of the bicycle to be suspended from the support pole 521 position would be brought to rest slightly behind the support pole 511, and one of the pedals of the bicycle to be suspended from the support pole 511 would be brought to rest slightly behind the support pole 521.

One example of an alternative manner of high/low staggering of the suspended bicycles on a storage unit is shown in FIG. 6, in which a unit 600 has:

on one side, a series of support poles are arranged with a line 640H of hanging components secured in a high position on every other support pole, and a line 640L of hanging components secured in a low position on every other support pole; and on the other side, a series of support poles are arranged with a line 660H of hanging components secured in a high position on every other support pole, and a line 660L of hanging components secured in a low position on every other support pole.

As in unit 500, the parallel support poles of unit 600 may also be paired so that they are secured to the unit at a geometrically shorter distance than are the poles adjacent to the paired poles. However, unlike unit 500, adjacent support poles of the unit 600 with the same type of hanging components' position may be paired so that poles with hanging components secured in a high position are secured to the unit 600 at a geometrically shorter distance than are the poles adjacent to the paired high position poles, and poles with hanging components secured in a low position are secured to the unit 600 at a geometrically shorter distance than are the poles adjacent to the paired low position poles. The pairings may be seen in FIG. 6 with ovals pairing poles and their pairing by position type designated (H,H) or (L,L).

Alternatively, in another configuration, as shown in FIG. 7, a unit 700 has:

on one side, a series of support poles are arranged with a line 40E of hanging components secured at the same vertical height on all support poles on that side of the unit 700; and on the other side, a series of support poles are arranged with a line 760H of hanging components secured in a high position on every other support pole, and a line 760L of hanging components secured in a low position on every other support pole; and As in units 500, 600 the parallel support poles of unit 700 may also be paired so that they are secured to the unit at a geometrically shorter distance than are the poles adjacent to the paired poles, with every other pole on the side with hanging components secured at the same vertical height paired with a high type of hanging component; and every other pole on the side with hanging components secured at the same vertical height paired with a low type of hanging component. The pairings may be seen in FIG. 7 with solid lines pairing poles and their pairing by position type designated (H,E) or (L,E).

While securing hanging components at the same vertical height on one side of the unit 700 may raise the risk of bicycle parts, especially handlebars, from interfering with each other, unit 700 may be made longer to allow for greater distance between individual suspended bicycles. Also, there may be units designed for which the even heights of bicycles may be desired, for example, when the unit is arranged to suspend children's bicycles on one side and adult's' bicycles on the other side. Thus, it can be seen that the set of hanging components in a unit may be staggered on the support posts of a unit such that they are positioned at multiple vertical heights from the ground. Similarly, a set of hanging components in a unit may be staggered on the support posts in a pattern that is not necessarily alternating or zigzagging (with H, M, H, L, H, M, L, M, L, M along a side of an exemplary unit and a complementary hanging component height type on the other side of the exemplary unit), depending on the priorities of the designer, who may choose to accommodate the efficient storage of a number and/or non-uniform geometries of bicycles along their lengths and widths.

The foregoing descriptions have been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments. It is intended that the specification and examples be considered as exemplary only, with a true scope and spirit of the invention being indicated by the following claims.

The invention claimed is:

1. A bicycle storage unit comprising:

a support base having generally parallel and horizontal first and second base frame bars spaced apart from each other and secured directly or indirectly to each other to define an interior space therebetween, the interior space having a defined width, height, and length; and a plurality of generally vertical and parallel support posts extending perpendicularly from the base frame bars, wherein the support posts are arranged on the first and second base frame bars to store a selected number of bicycles in a double row along the length of the unit, with a first row of bicycles on a first side of the bicycle storage unit and a second row of bicycles on a second side of the bicycle storage unit, with the bicycles stored in a "front wheel up" configuration in which a selected bicycle front wheel of a selected bicycle is positioned vertically above a selected bicycle rear wheel of the selected bicycle, and with the selected bicycle rear wheel and the selected bicycle front wheel aligned in a vertical line through the interior space, wherein a first set of support posts is secured to the first base frame bar to form the first side, with the first set of support posts having a first support post with an interior space-facing surface that is arranged to receive a first bicycle and that is arranged to suspend the first bicycle therefrom, wherein a second set of support posts is secured to the second base frame bar to form the second side, with the second set of support posts having a second support post with an interior space-facing surface that is arranged to receive a second bicycle and that is arranged to suspend the second bicycle therefrom, wherein adjacent first support posts comprise support posts in the first set of support posts that are adjacent to each other on the first side and are spaced apart on the first side a selected first distance to define a first space on the first base frame bar between the adjacent first support posts, with the first space sized to allow at least a portion of the second bicycle to be passed across the first space and across the interior space toward the second support post, with the second support post positioned on the second base frame bar directly across the interior space from the first space, and wherein adjacent second support posts comprise support posts in the second set of support posts that are adjacent to each other on the second side and are spaced apart on the second side a selected second distance to define a second space on the second base frame bar between the adjacent second support posts, with the second space sized to allow at least a portion of the first bicycle to be passed across the second space and across the interior space toward the first support post, with the first support post positioned on the first base frame bar directly across the interior space from the second space.

2. The bicycle storage unit of claim 1,
wherein the first support post is positioned directly across the interior space from a second space location that is asymmetrically spaced in the second space between the adjacent second support posts, with the second space location spaced closer to one of the adjacent second support posts than to another of the adjacent second support posts.

3. The bicycle storage unit of claim 1, further comprising an extent of distance that the first bicycle is movable across the interior space from the second side without interfering with components of one or more bicycles suspended from the support posts on the second side.

4. The bicycle storage unit of claim 3, wherein the extent of distance is based on dimensions of the first bicycle.

5. The bicycle storage unit of claim 3, wherein the extent of distance further comprises a selected distance across the interior space from the second side, at which, when the first bicycle is disposed between the adjacent second support posts:
wherein one pedal of the first bicycle is positioned behind one of the adjacent second support posts, and
wherein another pedal of the first bicycle is positioned within the interior space between the first side and the second side.

6. The bicycle storage unit of claim 1, further wherein the first support post and the adjacent second support posts are location is positioned such that, when the first bicycle is disposed vertically between the adjacent second support posts:
one pedal of the first bicycle is positionable behind one of the adjacent second support posts, and
another pedal of the first bicycle is positionable within the interior space between the first side and the second side.

7. The bicycle storage unit of claim 1, further comprising a hoisting system secured to the interior space-facing surface of the first support post, with the hoisting system facing the interior space and on the first support post, wherein the hoisting system is arranged to receive the first bicycle across the interior space from the second space and to lift the first bicycle into vertical storage on the interior space-facing surface of the first support post, with a rear wheel of the first bicycle and a front wheel of the first bicycle aligned in a vertical line through the interior space.

8. The bicycle storage unit of claim 1, further comprising at least one bicycle hanging component,
wherein a selected bicycle hanging component is secured to an interior space-facing surface of a selected support post, and
wherein a plurality of bicycle hanging components are positioned at selected heights on a plurality of associated support posts on a selected side of the bicycle storage unit to allow for bicycles to be suspended from the plurality of associated support posts across from the other side at varying distances from the support base on the selected side.

9. The bicycle storage unit of claim 8,
wherein one characteristic of the bicycle hanging component position types comprises a vertical distance from the selected bicycle hanging component to an upper surface of the selected support post, and
wherein the selected support post is assigned a bicycle hanging component position type based on a desired vertical distance of the selected bicycle hanging component from the upper surface of the selected support post.

10. The bicycle storage unit of claim 9, further comprising a first space location in the first space that is directly across the interior space from the second support post and that is spaced geometrically closer to one of the adjacent first support posts than to another of the adjacent first support posts, and is based on:
a first bicycle hanging component position type associated with the one of the adjacent first support posts, and
a second bicycle hanging component position type associated with the second support post.

11. A method, comprising:
forming a support base for a bicycle storage unit by spacing generally parallel first and second base legs apart from each other to define an interior space therebetween, the interior space having a defined width, length, and height;
extending a plurality of generally vertical and parallel support posts perpendicularly from the first and second base legs to form a first side of the bicycle storage unit and a second side of the bicycle storage unit, wherein the extending further comprises:
forming the first side by securing a first set of support posts to the first base frame bar, with the first set of support posts having a first support post that is arranged to suspend the first bicycle therefrom, and
forming the second side by securing a second set of support posts to the second base frame bar, with the second set of support posts having a second support post that is arranged to receive a second bicycle and that is arranged to suspend the second bicycle therefrom;
arranging the support posts to store a selected number of bicycles in a double row along the length of the unit, with a first row of bicycles on the first side and a second row of bicycles on the second side;
arranging the first support post on the first side to receive a first bicycle onto an interior space-facing surface of the first support post;

arranging a second support post on the second side to receive a second bicycle onto an interior space-facing surface of the second support post;

spacing adjacent first support posts apart by a selected first distance, with the adjacent first support posts comprising support posts in the first set of support posts that are adjacent to each other on the first side, wherein the spacing the adjacent first support posts apart defines a first space on the first base frame bar between the adjacent first support posts, and positioning the second support post on the second base frame bar directly across the interior space from the first space;

spacing adjacent second support posts apart by a selected second distance on the second side, wherein the spacing the adjacent second support posts apart defines a second space on the second base frame bar between the adjacent second support posts, and positioning the first support post on the first base frame bar directly across the interior space from the second space;

passing at least a portion of the first bicycle between the adjacent second support posts across the second space, and across the interior space toward the first support post, and suspending the first bicycle from the interior space-facing surface of the first support post, with the first bicycle stored in a "front wheel up" configuration in which a front wheel of a selected bicycle is positioned vertically above a rear wheel of the selected bicycle, and with a rear wheel of the first bicycle aligned vertically with a front wheel of the first bicycle; and passing at least a portion of the second bicycle between the adjacent first support posts across the first space, and across the interior space toward the second support post, and suspending the second bicycle from the interior space-facing surface of the second support post, with the second bicycle stored in the "front wheel up" configuration, and with a rear wheel of the second bicycle aligned vertically with a front wheel of the second bicycle.

12. The bicycle storage method of claim 11, further comprising
passing the first bicycle through the second space at a location that is asymmetrically spaced between the adjacent second support posts, with the second space location spaced closer to one of the adjacent second support posts than to another of the adjacent second support posts.

13. The bicycle storage method of claim 11, further comprising limiting an extent of distance from the second side toward the first side in which the first bicycle is movable across the interior space.

14. The bicycle storage method of claim 13, wherein limiting the extent of distance further comprises preventing movement of the first bicycle into at least one region in which components of one or more bicycles suspended from the support posts may be present.

15. The bicycle storage method of claim 13, wherein limiting the extent of distance further comprises capping the extent of distance of the first bicycle across the interior space to a length from the second side with:
one pedal of the first bicycle positioned behind one of the adjacent second support posts, and
another pedal of the first bicycle positioned within the interior space.

16. The bicycle storage method of claim 13, further comprising basing an extent of distance that the first bicycle is movable across the interior space from the second side on dimensions of the first bicycle.

17. The method of claim 11, further comprising positioning a second space location in the second space directly across the interior space from the first support post such that, when the at least a portion of the first bicycle is moving across the second space,
wherein one pedal of the first bicycle becomes positioned behind one of the adjacent second support posts, and
wherein another pedal of the first bicycle becomes positioned within the interior space between the first side and the second side.

18. The bicycle storage method of claim 11, further comprising:
securing a hoisting system to the first support post, with the hoisting system on the interior space-facing surface of the first support post,
receiving the first bicycle onto the hoisting system across the interior space from the second space, and
lifting the first bicycle into vertical storage on the interior space-facing surface of the first support post with the hoisting system.

19. The bicycle storage method of claim 11, further comprising:
securing bicycle hanging components to the support posts, with a selected hanging component secured to the interior space-facing surface of a selected support post on a selected side of the bicycle storage unit, and
staggering the bicycle hanging components at selected heights on the support posts to allow for the bicycles to be suspended therefrom at varying distances from the support base on the selected side.

20. The bicycle storage method of claim 19, further comprising:
associating a plurality of bicycle hanging component position types with the support posts, with the bicycle hanging component position types having a characteristic of vertical distance from a support post/hanging component secured to a given support post to the support base,
assigning a desired bicycle hanging component position type to the selected support post based on a desired vertical location of the selected bicycle hanging component on the selected support post, and
selecting the location in the second space across which the first bicycle is passed to be geometrically closer to one of the adjacent second support posts than to another of the adjacent second support posts, with the selecting based on
a second hanging component position type associated with the one of the adjacent second support posts, and
a first hanging component position type associated with the first support post.

21. The bicycle storage method of claim 11, further comprising bringing at least one pedal of the first bicycle to rest during storage of the first bicycle.

22. The bicycle storage unit of claim 1, wherein one of the adjacent second support posts is arranged to bring at least one pedal of the first bicycle to rest during storage of the first bicycle.

* * * * *